Figure 1:
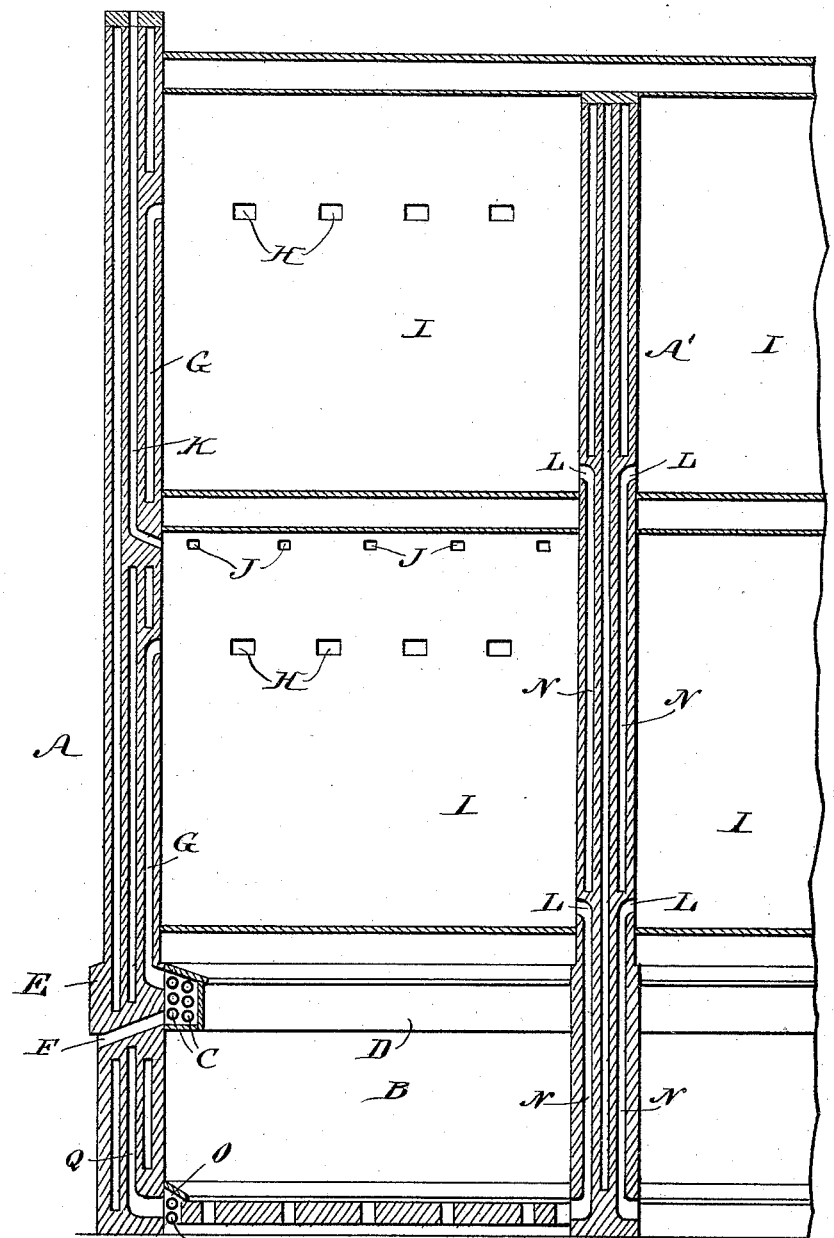

(No Model.)  D. ANDREWS.  3 Sheets—Sheet 1.
HEATING AND VENTILATING BUILDINGS.

No. 445,486.  Patented Jan. 27, 1891.

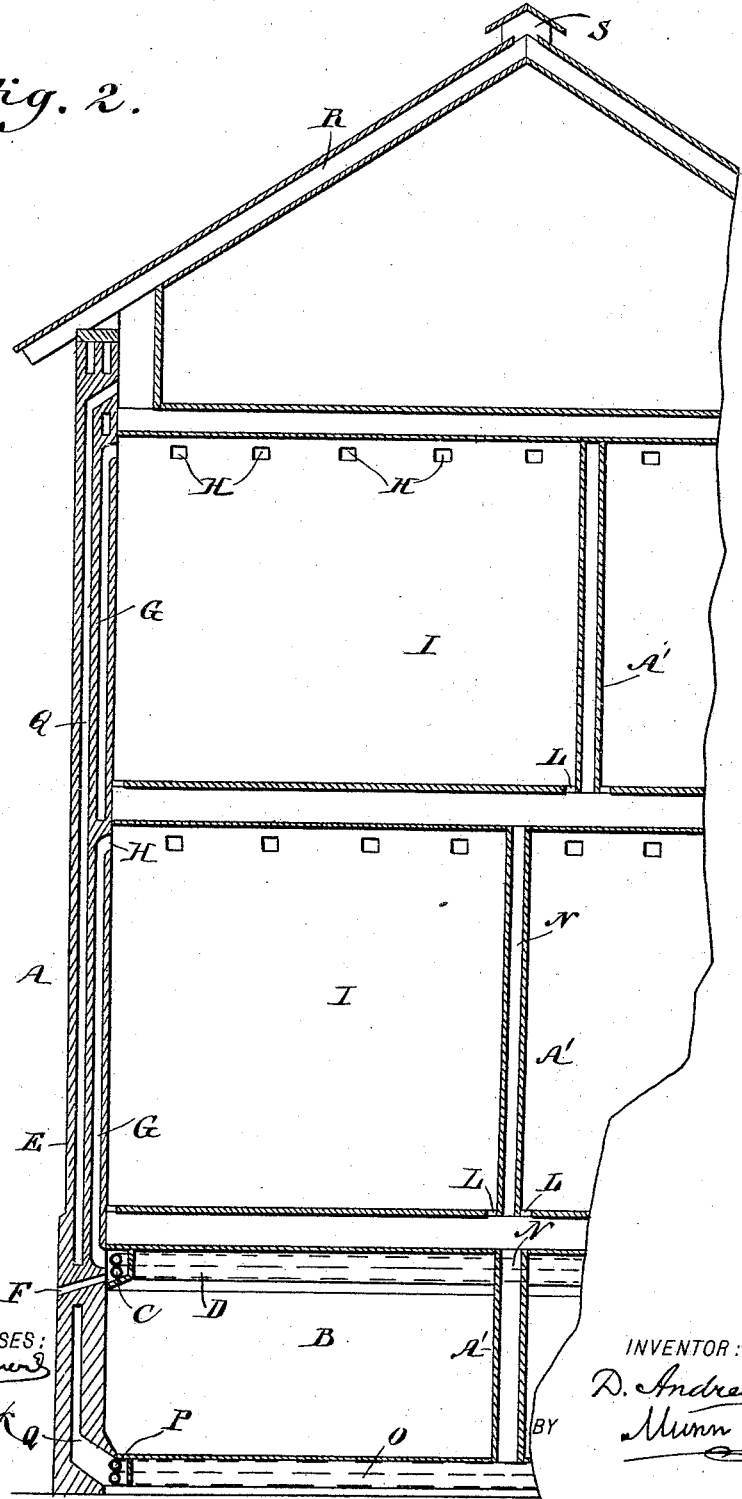

(No Model.) 3 Sheets—Sheet 3.
D. ANDREWS.
HEATING AND VENTILATING BUILDINGS.
No. 445,486. Patented Jan. 27, 1891.
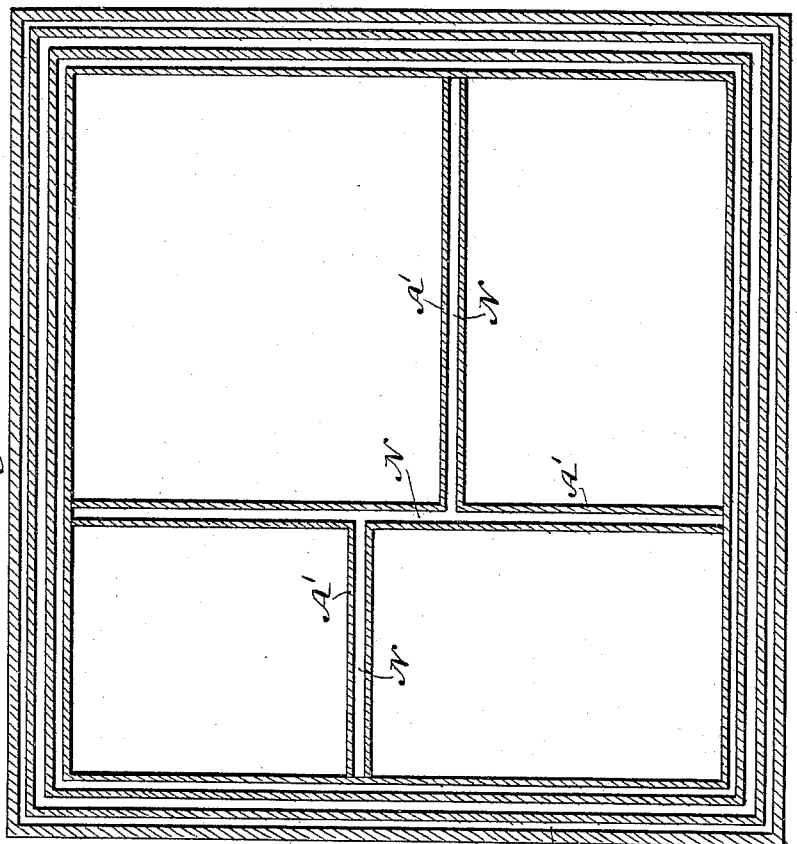
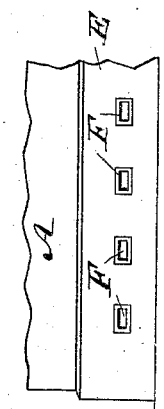
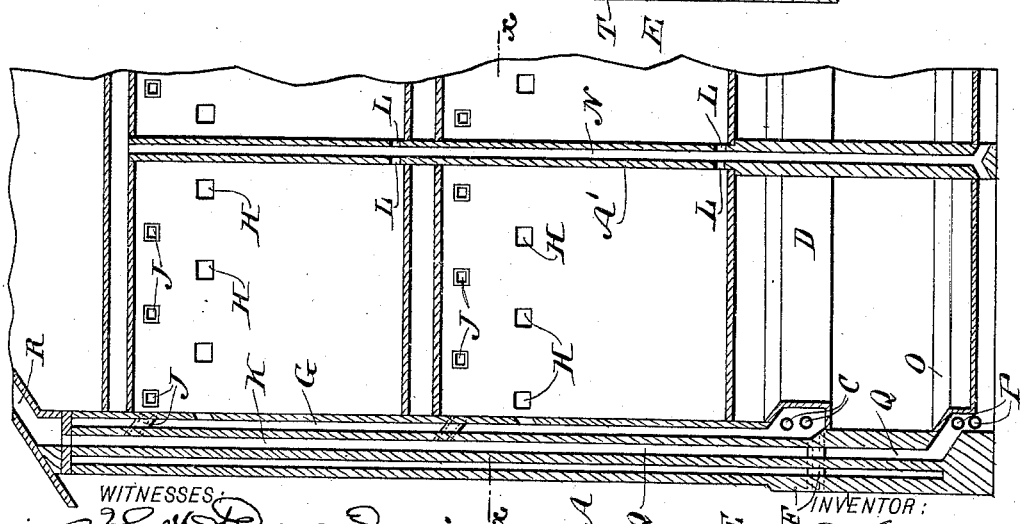
WITNESSES: INVENTOR:
D. Andrews
BY
Munn & Co.
ATTORNEYS

UNITED STATES PATENT OFFICE.

DONALD ANDREWS, OF LOCKPORT, NEW YORK.

HEATING AND VENTILATING BUILDINGS.

SPECIFICATION forming part of Letters Patent No. 445,486, dated January 27, 1891.

Application filed February 27, 1890. Serial No. 341,914. (No model.)

*To all whom it may concern:*

Be it known that I, DONALD ANDREWS, of Lockport, in the county of Niagara and State of New York, have invented certain new and useful Improvements in Heating and Ventilating Buildings, of which the following is a full, clear, and exact description.

The object of the invention is to provide certain new and useful improvements in heating and ventilating buildings, whereby all foul and vitiated air is constantly removed from the rooms and the latter are supplied during cold weather with pure heated air and in summer with fresh cool air.

The invention consists of air-passages arranged in the walls of the building and connected at their lower ends with a fresh-air passage extending from the outside of the building and led over coils of incased heating-pipes.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of part of a building provided with the improvements, and Fig. 2 is a like view of the improvements as applied to a frame building. Fig. 3 is a sectional side elevation of the improvement. Fig. 4 is a sectional plan view of the same on the lines $x\ x$ of Fig. 1. Fig. 5 is a side elevation of part of the improvement.

The building A, on which the improvements are applied, is provided in its cellar or lower part with a series of heating-pipes C, arranged around the outer wall E of the building and inclosed in a casing D, secured to the inside of the wall, as is plainly shown in the drawings. The pipes C are charged during winter-time with steam, hot water, or other fluid, and into the casing D, near the bottom, lead fresh-air passages F, extending through the outer walls E to the outside of the building.

From near the top of the casing D extends upward a continuous air-passage G, formed in the walls E, and connected by openings H with the several rooms I of the building A. The said openings H are located a suitable distance below the ceilings, and near the latter are arranged small openings J, which lead into air-passages K, also arranged in the outer or continuous walls E of the building, and leading to the outside near or at the top of the building, as shown in Fig. 1.

From the bottom of each room I lead a series of openings L to channels N, formed in the partitions A' of the building, extending downward and opening at their lower ends into a casing O, arranged on the floor of the cellar B, and containing heating-pipes P, charged with steam, water, or other fluid. From this casing O lead upward a continuous passage Q, extending through the outer walls of the building and discharging at or near the top of the building. This passage Q, as shown in Fig. 2, may lead into a channel R, formed under the roof of the building, the channel R opening into a protected ventilated dome S, arranged on the ridge of the building. When the foul air is discharged, as in Fig. 2, a series of heating-pipes may be placed at the bottom of channels R, so as to assure the rapid discharge at ventilating-dome S. Dead-air space T is formed in the outer walls E of the building, so as to prevent the absorption of heat by the exposed portion of the walls E from the ascending current of reheated air in the passage or channel Q.

In frame houses the openings L are or may be formed in the floors of the several rooms and open into the spaces between the floors and the ceilings, which spaces open into the hollow partitions A', connected with the casing O.

Now, in the winter-time, when the pipes C and P are heated, fresh air from the outside can pass into the air-inlets F to the interior of the casing D, to be heated therein by the heat radiating from the pipes C. The heated air naturally rises in the channels G and discharges into the rooms I through the openings H. The vitiated air in the rooms passes near or on the floor of the several rooms through the openings L into the downwardly-extending channels N, formed in the partitions A', the vitiated air finally passing into the casing O in the cellar, in which it is again heated, and rises in the channels Q, which lead the heated vitiated air to the outside of the building at or near the top of the same. The foul air accumulating under the ceiling of each room is carried off by passing through the openings J in the channels K, leading to the outside of the building at or near its top.

The main object of having the reheated foul air ascend through continuous air-passage G and under the roof through passage R is to envelop the entire building with a volume of circulating warm air, thus preventing the heat of the heated fresh-air current from being absorbed by the outer cooler portion of the walls E during the time this heated fresh-air current is passing up the channel G to the rooms. The object in having the air space or passage G also continuous horizontally as as well as vertically is to overcome the necessity of having the air to be admitted through this passage heated to an excessively high temperature, also the uninterrupted circulation of this volume of warm air in the passage G will warm the inner surface of the wall A, and thus prevent all loss of heat from the air in the building when it comes in contact with the inner surface of the external walls.

The object of having the incoming and outgoing air broken up into many small currents by the use of numerous small registers is the more equal distribution of air through the building and obviating the unpleasant drafts caused by the admission of air in large volumes.

In the summer-time the pipes C are not heated, but the pipes P are, so that the fresh air from the outside can pass through the air-inlets F, through the casing D to the several channels G into the rooms I, while the vitiated air is drawn from the floor of the building through the channels N to the casing O, in which it is heated by the pipes P and passes off through the channel Q to the top of the building. Thus the rooms can be heated with pure air during the winter and supplied with cool air during the summer.

Having thus fully described my invention, I claim as new and desire to secure by Letters Patent—

1. In a building, walls provided with a continuous fresh-air passage arranged near the inside of the walls and a second continuous foul-air-discharge passage arranged next to the fresh-air passage near the outside of the walls, in combination with means for heating the incoming air at the lower ends of the said two passages, substantially as shown and described.

2. In a building, walls provided with a continuous fresh-air passage arranged near the inside of the walls, a second continuous foul-air-discharge passage arranged next to the fresh-air passage near the outside of the walls, outlets formed in the said walls and connecting the said fresh-air passage with the rooms, and hollow partitions connected with the room by openings and adapted to discharge with the said foul-air passage, in combination with means for heating the incoming air at the lower ends of the said two passages, substantially as shown and described.

DONALD ANDREWS.

Witnesses:
 ALVAH K. POTTER,
 WM. W. STORRS.